(12) United States Patent
Hofmann et al.

(10) Patent No.: US 8,207,241 B2
(45) Date of Patent: Jun. 26, 2012

(54) PLATINUM CATALYSTS SUPPORTED ON NANOSIZE TITANIUM DIOXIDE, THEIR USE IN HYDROSILYLATION AND COMPOSITIONS COMPRISING SUCH CATALYSTS

(75) Inventors: Marco Hofmann, Munich (DE); Hans-Juergen Eberle, Munich (DE)

(73) Assignee: Wacker Chemie AG, Munich (DE)

( * ) Notice: Subject to any disclaimer, the term of this patent is extended or adjusted under 35 U.S.C. 154(b) by 1125 days.

(21) Appl. No.: 11/720,889

(22) PCT Filed: Dec. 1, 2005

(86) PCT No.: PCT/EP2005/012840
§ 371 (c)(1),
(2), (4) Date: Jun. 5, 2007

(87) PCT Pub. No.: WO2006/061138
PCT Pub. Date: Jun. 15, 2006

(65) Prior Publication Data
US 2009/0286899 A1 Nov. 19, 2009

(30) Foreign Application Priority Data
Dec. 9, 2004 (DE) .......................... 10 2004 059 375

(51) Int. Cl.
C08F 283/12 (2006.01)
C08F 7/00 (2006.01)
C08F 283/00 (2006.01)
B01J 23/42 (2006.01)
C07F 7/12 (2006.01)
C08G 77/06 (2006.01)

(52) U.S. Cl. ..... 522/99; 556/479; 502/339; 204/157.74; 525/478; 528/15

(58) Field of Classification Search .................... 528/15, 528/31–330; 556/479; 522/99; 502/39, 502/339, 399; 204/157.74, 157.4, 154.7; 525/478
See application file for complete search history.

(56) References Cited

U.S. PATENT DOCUMENTS

| | | | |
|---|---|---|---|
| 2,637,738 A | 5/1953 | Wagner et al. | |
| 2,970,150 A | 1/1961 | Bailey et al. | |
| 3,168,544 A | 2/1965 | Jex et al. | |
| 3,706,777 A | 12/1972 | Seiler et al. | |
| 3,715,334 A | 2/1973 | Karstedt et al. | |
| 3,775,452 A | 11/1973 | Karstedt et al. | |
| 4,224,233 A | 9/1980 | Seiler et al. | |
| 4,510,094 A * | 4/1985 | Drahnak | 556/11 |
| 4,530,879 A | 7/1985 | Drahnak et al. | |
| 4,716,859 A | 1/1988 | König et al. | |
| 4,743,576 A | 5/1988 | Schneider et al. | |
| 5,250,490 A * | 10/1993 | Ritscher et al. | 502/313 |
| 5,527,837 A * | 6/1996 | Kondou et al. | 523/216 |
| 6,005,131 A | 12/1999 | Jentsch et al. | |
| 6,153,782 A | 11/2000 | Kräuter et al. | |
| 6,177,585 B1 | 1/2001 | Chen et al. | |
| 6,387,487 B1 * | 5/2002 | Greenberg et al. | 428/355 R |
| 7,030,058 B1 | 4/2006 | Nakabayashi | |
| 7,038,001 B2 | 5/2006 | Breunig et al. | |
| 2003/0167878 A1 | 9/2003 | Al-Salim et al. | |

FOREIGN PATENT DOCUMENTS

| | | |
|---|---|---|
| DE | 20 12 229 | 9/1971 |
| DE | 28 30 231 A1 | 1/1980 |
| DE | 28 15 316 C2 | 3/1980 |
| DE | 33 40 569 A1 | 5/1985 |
| DE | 44 02 873 A1 | 8/1995 |
| DE | 198 57 223 C1 | 6/2000 |
| DE | 199 05 838 A1 | 8/2000 |
| DE | 100 25 964 A1 | 12/2001 |
| EP | 0 201 670 A2 | 11/1986 |
| EP | 0 398 701 B1 | 12/1995 |
| EP | 0 730 906 A1 | 9/1996 |
| EP | 0 787 734 A1 | 8/1997 |
| EP | 0 904 315 B1 | 5/2003 |
| JP | 2004000853 A | 1/2004 |
| JP | 4212242 B2 | 1/2009 |
| WO | WO-92/10529 | 6/1992 |
| WO | WO-92/10543 | 6/1992 |
| WO | WO-92/10544 | 6/1992 |
| WO | WO-95/25734 | 9/1995 |
| WO | WO-95/25735 | 9/1995 |
| WO | WO-97/40102 | 10/1997 |
| WO | WO-01/41926 A1 | 6/2001 |

OTHER PUBLICATIONS

Patbase abstract corresponding to DE 28 30 231 A1, (1980).
Patbase abstract corresponding to DE 100 25 964 A1, (2001).
Patbase abstract corresponding to EP 0 398 701 B1, (1995).
Patbase abstract corresponding to DE 44 02 873 A1, (1995).
Patbase abstract corresponding to DE 199 05 838 A1, (2000).
US 4,716,859 is corresponding to EP 0 201 670 A2, (1988).
US 6,153,782 is corresponding to DE 198 57 223 C1, (2000).
US 4,743,576 is corresponding to DE 33 40 569 A1, (1988).
US 3,706,777 is corresponding to DE 20 12 229, (1972).
US 6,005,131 is corresponding to EP 0 787 734 A1, (1999).
US 4,224,233 is corresponding to DE 28 15 316 C2, (1980).
US 7,038,001 B2 is corresponding to EP 0 904 315 B1, (2006).
Boudjouk et al., Han et al., Organic Sonochemistry. Ultrasonic Acceleration of the Hydrosilation Reaction, Organometallics, 1983, pp. 769-771, vol. 2.
Noll et al., Chemistry and Technology of Silicones, Academic Press, Inc. (Front Page, Preface and Index enclosed), (1968).
Marciniec et al., Comprehensive Handbook on Hydrosilylation, Pergamon Press, 1992 (Front Page, Preface and Index enclosed).
Kennedy et al., Photothermal Heterogeneous Oxidation of Ethanol over Pt/TiO2, Journal of Catalysis, 1998, pp. 375-389, vol. 179.
US 3,715,334 is corresponding to US 3,775,452, (1973).

* cited by examiner

Primary Examiner — Mark Eashoo
Assistant Examiner — Jessica Paul
(74) Attorney, Agent, or Firm — Brooks Kushman P.C.

(57) ABSTRACT

Nanosize titanium dioxide having supported thereon metallic platinum are efficient hydrosilylation catalysts whose hydrosilylation activity may be increased by irradiation. The catalysts are prepared by depositing soluble platinum compounds on a titanium dioxide sol or titanium dioxide pigments followed by drying, calcining, and reduction to platinum metal. The catalysts are particularly useful in preparing addition-curable organopolysiloxane elastomers.

8 Claims, No Drawings

US 8,207,241 B2

PLATINUM CATALYSTS SUPPORTED ON NANOSIZE TITANIUM DIOXIDE, THEIR USE IN HYDROSILYLATION AND COMPOSITIONS COMPRISING SUCH CATALYSTS

CROSS-REFERENCE TO RELATED APPLICATION

This application is the U.S. national phase of PCT Appln. No. PCT/EP2005/012840 filed Dec. 1, 2005, which claims priority to German application 10 2004 059 375.2 filed Dec. 9, 2004.

BACKGROUND OF THE INVENTION

1. Field of the Invention

The invention relates to platinum catalysts supported on nanosize titanium dioxide (Pt/TiO$_2$ catalysts), their use in hydrosilylation, a hydrosilylation process using such catalysts and compositions comprising such catalysts.

2. Description of the Related Art

The addition of Si—H-functional compounds onto compounds having aliphatic unsaturated bonds, in particular C═C double bonds, (hydrosilylation) has been known for a long time.

Si-containing organic compounds, organosilanes and organopolysiloxanes can be prepared by hydrosilylation. Hydrosilylation has been used in particular in the addition-crosslinking curing of organopolysiloxanes in the silicone industry, for example for producing elastomers, molding compositions in the dental industry or antiadhesive coatings in the paper and films industry.

Catalysts used for the hydrosilylation reaction are most frequently platinum and its compounds, with the platinum being used either in metallic form, as metal immobilized on an inorganic support, as platinum salts, or in the form of a soluble or insoluble platinum complex.

Up to the present day, the major part of hydrosilylation reactions carried out in industry are carried out using the "Karstedt catalyst" known from U.S. Pat. No. 3,715,334 and U.S. Pat. No. 3,775,452, a dimeric platinum-tetramethyldivinyldisiloxane complex which can be described by the formula [Pt$_2$(TMDVS)$_3$] (TMDVS=tetramethyldivinyldisiloxane). The Karstedt catalyst is prepared from hexachloroplatinic acid H$_2$PtCl$_6$, which is likewise frequently used as hydrosilylation catalyst.

Platinum-catalyzed hydrosilylation reactions in which activation is by means of UV and/or visible light are also known from the prior art. Known photoactive platinum compounds are, for example, CpPtMe$_3$ known from U.S. Pat. No. 4,510,094 and WO92/10543, Pt(acac)$_2$ known from EP 0398701, (COD)PtR$_2$, where R is an aryl radical, known from U.S. Pat. No. 4,530,879, WO92/10529 and WO92/10544, Me$_3$Pt(O O), where O O represents, for example, acetylacetonato or tropolonato ligands, known from WO95/25735 and (TMDVS)Pt-L, where L is generally a chromophoric ligand, known from WO95/25734. All these compounds display, if appropriate in combination with a suitable photoinitiator or photosensitization catalyst, catalytic activity in respect of the crosslinking of polysiloxanes at room temperature under the action of UV and/or visible light. Furthermore, these catalysts are used in the homogeneous phase and frequently display a higher activity and selectivity than comparable catalysts used heterogeneously.

A great process disadvantage of homogeneous catalysts is the difficulty of separating them from the product formed and/or solvent present and the difficult recovery associated therewith. A further disadvantage of hydrosilylation catalysts used homogeneously is the frequently quite short operating life caused by the formation of catalytically inactive species.

On the other hand, supported Pt catalysts often display lower activities or selectivities in hydrosilylation. However, they have, as (simple) heterogeneous catalysts, the advantage that they are substantially more robust and less sensitive, therefore have a longer operating life, and can also be separated and recovered more easily.

Platinum hydrosilylation catalysts immobilized on an inorganic support, frequently carbon, for example in the form of carbon black or activated carbon, are known from the prior art. Such supported catalysts are, for example, described in U.S. Pat. No. 2,637,738, DE 2815316 and DE 2012229 and also from P. Boudjouk, B. H. Han, Organometallics 1983, 2, 769-771.

Furthermore, γ-Al$_2$O$_3$ (U.S. Pat. No. 3,168,544, U.S. Pat. No. 2,970,150) has also frequently been used as support material for heterogeneous Pt catalysts.

EP 0904315 B1 describes heterogeneous, supported Pt catalysts on the supports carbon black, activated carbon, Al$_2$O$_3$, barium silicate and barium oxide for the hydrosilylation of C═C-functional epoxy compounds by means of SiH-functional polysiloxanes.

TiO$_2$-supported Pt catalysts have generally been known for a long time, e.g. from DE 3340569 for the production of synthesis gas or H$_2$, from EP 201670 for methanol conversion, from EP 730906 as oxidation catalysts, from DE 19905838 as hydrogenation catalysts or from WO 01041926 as hydrooxidation catalysts.

A process for preparing 3-functionalized propylsilanes by hydrosilylation of allyl chloride by means of SiH-functional silanes in the presence of a supported multielement catalyst in which one element is platinum supported on TiO$_2$ has been described in DE 19857223. US 6177585 describes a process for the hydrosilylation of C═C-functional compounds by means of SiH-functional silanes in the presence of supported bimetallic catalysts comprising platinum on a support comprising titanium dioxide.

However, all supported platinum hydrosilylation catalysts known from the prior art display an activity which is too low, in particular for applications in which a particularly rapid reaction is required. Furthermore, the TiO$_2$-supported platinum catalysts used hitherto for hydrosilylation reactions in prior art are mixed metal catalysts.

Particular catalysts comprising nanosize TiO$_2$ and platinum or obtained from nanosize TiO$_2$ by means of a sol-gel process are known from DE 4402873 A1, DE 2830231 A1 and DE 10025964 A1.

DE 4402873 A1 discloses compositions comprising platinum particles, polymers and nanosize titanium dioxide which are obtainable by a sol-gel process.

DE 2830231A1 discloses a platinum-containing supported catalyst whose support may be a porous gel of titanium dioxide, likewise obtained by a sol-gel process.

DE 10025964 A1 describes heterogeneous catalysts based on a nanosize magnetizable support material which may comprise, inter alia, titanium dioxide and platinum as catalytically active substance.

However, the prior art does not disclose any heterogeneous catalyst which consists exclusively of platinum applied to nanosize titanium dioxide.

SUMMARY OF THE INVENTION

It is therefore an object of the invention to provide a hydrosilylation catalyst which has a higher activity than the heterogeneous catalysts known from the prior art. These and other objects are achieved by the use of a heterogeneous platinum catalyst supported on nanosize titanium dioxide ($TiO_2$) as a catalyst in hydrosilylation, and also a hydrosilylation process in the presence of such catalysts. The object has been achieved especially by a catalyst obtained from a $TiO_2$ sol or a nanosize $TiO_2$ powder and a solution containing platinum ($Pt/TiO_2$ catalyst) and the use of such a catalyst.

DETAILED DESCRIPTION OF THE PREFERRED EMBODIMENT(S)

It has surprisingly been found that catalysts based on platinum supported on nanosize $TiO_2$ catalyze hydrosilylations with high activity and selectivity. Furthermore, it has surprisingly been found that, in particular, heterogeneous platinum catalysts based on nanosize titanium dioxide as a support can exhibit a further increase in activity as a result of irradiation.

The use of catalysts obtainable by reaction of a $TiO_2$ sol or a nanosize $TiO_2$ powder and a solution containing platinum as hydrosilylation catalyst has hitherto not been described in the prior art.

The invention provides catalysts consisting of platinum on a nanosize titanium dioxide support.

Such catalysts can be obtained by reaction of a titanium dioxide sol or nanosize titanium dioxide powder with a solution containing platinum.

In particular, such catalysts can be obtained by a process comprising the steps
a) reaction of a titanium dioxide sol or nanosize titanium dioxide powder with a solution containing platinum,
b) drying of the product obtained in step a),
c) calcination of the product obtained in step b) and
d) reduction of the product obtained in step c).

The solution containing platinum is preferably obtained by dissolution of a platinum salt or a platinum compound; in particular, the solution is a solution of a platinum salt.

The titanium dioxide component used for producing the catalyst of the invention is preferably a nanosize $TiO_2$ powder or $TiO_2$ sol, in particular a $TiO_2$ sol.

The reaction of step a) preferably occurs exclusively in the presence of the titanium dioxide component and the platinum component, if appropriate in the presence of a solvent, preferably water.

The invention therefore further provides for the use of platinum applied to nanosize titanium dioxide as a support as a catalyst for hydrosilylation, in particular catalysts consisting of platinum on a nanosize titanium dioxide support or catalysts obtainable by reaction of a titanium dioxide sol or nanosize titanium dioxide powder with a solution containing platinum.

The invention further provides a process for hydrosilylation in the presence of a platinum catalyst applied to nanosize titanium dioxide. Preference is given to using a catalyst consisting of platinum on a nanosize titanium dioxide support, in particular a catalyst obtainable by reaction of a titanium dioxide sol or nanosize titanium dioxide powder with a solution containing platinum.

For the present purposes, hydrosilylation is the optionally thermally induced reaction (addition) of a compound having at least one silicon-hydrogen bond with a compound having at least one aliphatically unsaturated carbon-carbon bond. The term hydrosilylation refers in particular to the addition, if appropriate with additional introduction of heat energy (thermal addition), of silicon compounds containing silicon-bonded hydrogen, for example SiH-functional polysiloxanes or SiH-functional organo-silanes, onto a compound containing at least one aliphatic multiple bond, in particular an olefinic or acetylenically unsaturated site.

The invention also provides a process for the addition reaction of a compound containing at least one silicon-bonded hydrogen atom onto a compound having at least one aliphatic unsaturated site in the presence of a platinum catalyst applied to nanosize titanium dioxide.

The catalysts of the invention are highly suitable as supported heterogeneous hydrosilylation catalysts.

An important characteristic of the catalysts of the invention is that platinum, a platinum salt and/or a platinum compound are/is applied to nanosize titanium dioxide as support.

Furthermore, it has been found that additional irradiation with a radiation source, in particular a UV radiation source, enables the desired catalyzed reaction to be accelerated further. The already high activity of $TiO_2$-supported platinum as a catalyst for hydrosilylation can additionally be increased further by irradiation with a radiation source, in particular a UV radiation source.

The invention accordingly also provides a process for the radiation-activated addition reaction of a compound containing at least one silicon-bonded hydrogen atom onto a compound having at least one aliphatic unsaturated site in a reaction mixture in the presence of a platinum catalyst applied to nanosize titanium dioxide as support in which the reaction mixture is additionally exposed to radiation.

As regards preferred embodiments of the compounds (reactants) for carrying out the process of the invention, reference is made to the components of the compositions, which are described in detail below.

In a particularly advantageous embodiment of the process of the invention with additional irradiation, the catalysts of the invention obtainable by reaction of a titanium dioxide sol or nanosize titanium dioxide powder with a solution containing platinum are used. These catalysts display a particularly high additional ability to be activated by irradiation. Platinum catalysts supported on titanium dioxide which are not produced using a titanium dioxide sol or nanosize titanium dioxide powder likewise display catalytic activity in hydrosilylation. However, in this case their ability to be activated by irradiation is virtually negligible.

The radiation used for further activation is, in particular, actinic radiation, for example ultraviolet radiation or radiation in the visible region having a wavelength of from 200 nm to 800 nm, preferably less than 400 nm.

Particularly suitable UV radiation sources are radiation sources which emit below 400 nm, in particular low-, intermediate- and high-pressure mercury vapor lamps or "black lights" such as the UV lamp UVHAND 250 from Dr. Hönle.

The activation of homogeneous platinum hydrosilylation catalysts by irradiation has hitherto not been described for metallic platinum hydrosilylation catalysts immobilized on an inorganic support. The UV activation of hydrosilylation reactions in which $TiO_2$-supported platinum is used as catalyst is particularly advantageous.

In the hydrosilylation process of the invention, the platinum catalysts on which the process is based generally display a high activity and selectivity. These catalysts, used for the first time as hydrosilylation catalysts, combine the advantages of heterogeneous catalysts, e.g. stability, ease of removal and recoverability, with the high activity and ability to be activated further by irradiation, in particular by means of UV radiation, known for homogeneous catalysts.

The catalysts used in the process of the invention or the catalysts used in the compositions of the invention can in principle be used in all hydrosilylation reactions which are known from the prior art and are described, for example, in Walter Noll "Chemie und Technologie der Silicone", Verlag Chemie GmbH, Weinheim/Bergstr. 1968; Bogdan Marciniec, "Comprehensive Handbook on Hydrosilylation", Oxford: Pergamon Press, 1992 or are present in all hydrosilylatable, in particular crosslinkable, compositions known from the prior art.

The process can be employed both for the synthesis of low molecular weight compounds and for the curing of relatively high molecular weight compounds, in particular polymers having unsaturated groups, in particular carbon-carbon double bonds.

In particular, hydrosilylation reactions in which C=C-functional polysiloxanes are reacted with SiH-functional polysiloxanes or in which C=C-functional organosilanes are reacted with SiH-functional organosilanes are catalyzed.

Particular preference is given to the reaction of vinyl-terminated polydimethylsiloxanes with SiH-functional polysiloxanes of the general formula $Me_3SiO-[Si(H)(Me)O]_x-SiMe_3$, where x is from 1 to 500, in particular from 1 to 100, and of Si-vinyl-functional organosilanes with Si—H-functional organosilanes.

Specific examples of Si-vinyl-functional organosilanes which can be hydrosilylated by the process of the invention are vinyltrimethylsilane, vinyltriethoxysilane, vinylmethyldiethoxysilane, vinylmethyldimethoxysilane, and vinyltrichlorosilane.

Specific examples of SiH-functional organosilanes are $HSi(OR')_3$, where R' is an alkyl radical, $HSi(Me)_{3-y}Cl_y$, where y is from 1 to 3, and $HSiR''_3$, where R'' is an alkyl or aryl radical. The invention further provides hydrosilylatable compositions comprising (A) a compound having at least one aliphatically unsaturated carbon-carbon bond,
(B) a compound having at least one silicon-hydrogen bond and
(D) a platinum catalyst applied to nanosize titanium dioxide.

The term hydrosilylatable compositions refers particularly to crosslinkable compositions.

The catalyst (D) is preferably a catalyst consisting of platinum on a nanosize titanium dioxide support, in particular a catalyst obtainable by reaction of a titanium dioxide sol or nanosize titanium dioxide powder with a solution containing platinum.

In a preferred embodiment of the hydrosilylatable compositions, the compositions are polyorganosiloxane compositions comprising
(A) polyorganosiloxanes which have radicals having aliphatic carbon-carbon multiple bonds,
(B) polyorganosiloxanes having Si-bonded hydrogen atoms or, in place of (A) and (B),
(C) polyorganosiloxanes which have SiC-bonded radicals having aliphatic carbon-carbon multiple bonds and Si-bonded hydrogen atoms, and
(D) a platinum catalyst applied to nanosize titanium dioxide.

The components (A), (B) and (C) described for the hydrosilylatable compositions correspond to the compounds reacted in the process of the invention (reactants). Both the compositions and the process are based on the same novel platinum catalysts supported on titanium dioxide, in particular those which are obtained from the reaction of $TiO_2$ sols or nanosize $TiO_2$ powders with a platinum-containing solution.

The hydrosilylation process of the invention is carried out with introduction of heat and/or introduction of energy by means of radiation, in particular with two forms of introduction of energy. The same applies to the hydrosilylatable compositions of the invention for which the process of the invention is carried out with input of heat and/or radiation.

Such compositions preferably comprise compounds which have at least one aliphatically unsaturated carbon-carbon bond and are selected from the group consisting of vinyl-functional organosilanes and vinyl-terminated polydimethylsiloxanes and compounds which have at least one silicon-hydrogen bond and are selected from the group consisting of SiH-functional polysiloxanes and Si—H-functional organosilanes.

The invention likewise provides silicone elastomers which can be obtained by crosslinking of the above-described hydrosilylatable compositions, in particular the polyorganosiloxane compositions described.

The invention likewise provides polysiloxane or organosiloxane compositions produced by the process of the invention which can be used, for example, for producing dental imprints, adhesives, release liners, flat seals, sealants and coatings.

The compounds (A) and (B) or (C) used in the compositions of the invention are selected in a known manner so that crosslinking is possible. Thus, for example, compound (A) has at least two aliphatically unsaturated radicals and siloxane (B) has at least three Si-bonded hydrogen atoms, or compound (A) has at least three aliphatically unsaturated radicals and siloxane (B) has at least two Si-bonded hydrogen atoms, or siloxane (C) which has aliphatically unsaturated radicals and Si-bonded hydrogen atoms in the abovementioned ratios is used in place of compounds (A) and (B).

The compound (A) used according to the invention can also be a silicon-free organic compound having preferably at least two aliphatically unsaturated groups or an organosilicon compound having preferably at least two aliphatically unsaturated groups. Examples of organic compounds which can be used as component (A) in the compositions of the invention are 1,3,5-trivinylcyclohexane, 2,3-dimethyl-1,3-butadiene, 7-methyl-3-methylene-1,6-octadiene, 2-methyl-1,3-butadiene, 1,5-hexadiene, 1,7-octadiene, 4,7-methylene-4,7,8,9-tetrahydroindene, methylcyclopentadiene, 5-vinyl-2-norbornene, bicyclo[2.2.1]hepta-2,5-diene, 1,3-diisopropenylbenzene, polybutadiene containing vinyl groups, 1,4-divinylcyclohexane, 1,3,5-triallylbenzene, 1,3,5-trivinylbenzene, 1,2,4-trivinylcyclohexane, 1,3,5-triisopropenylbenzene, 1,4-divinylbenzene, 3-methyl-1,5-heptadiene, 3-phenyl-1,5-hexadiene, 3-vinyl-1,5-hexadiene and 4,5-dimethyl-4,5-diethyl-1,7-octadiene, N,N'-methylenebis(acrylamide), 1,1,1-tris(hydroxymethyl)propane triacrylate, 1,1,1-tris(hydroxymethy)propane trimethacrylate, tripropylene glycol diacrylate, diallyl ether, diallylamine, diallyl carbonate, N,N'-diallylurea, triallylamine, tris(2-methylallyl)amine, 2,4,6-triallyloxy-1,3,5,-triazine, triallyl-s-triazine 2,4,6(1H,3H,5H)trione, diallyl malonate, polyethylene glycol diacrylate, polyethylene glycol dimethacrylate, and poly(propylene glycol) methacrylate.

However, the silicone compositions of the invention preferably contain an aliphatically unsaturated organsilicon compound as constituent (A), with it being possible to use any aliphatically unsaturated organosilicon compounds which is useful in addition-crosslinking compositions, including, for example, silicone block copolymers having urea segments, silicone block copolymers having amide segments and/or imide segments and/or ester-amide segments and/or polystyrene segments and/or silarylene segments and/or carborane segments and silicone graft copolymers having ether groups.

As organosilicon compounds (A) which have SiC-bonded radicals having aliphatic carbon-carbon multiple bonds, preference is given to using linear or branched organopolysiloxanes comprising units of the average general formula (X)

$$R_a R^1_b SiO_{(4-a-b)/2}$$ (X)

where
the radicals R can be identical or different and are each an organic radical which is free of aliphatic carbon-carbon multiple bonds,
the radicals $R^1$ can be identical or different and are each a monovalent, substituted or unsubstituted, SiC-bonded hydrocarbon radical having an aliphatic carbon-carbon multiple bond,
a is 0, 1, 2 or 3 and
b is 0, 1 or 2,
with the proviso that the sum a+b is less than or equal to 3 and on average at least 2 radicals $R^1$ are present per molecule.

The radical R can be a monovalent or polyvalent radical, with a polyvalent radical, e.g. a bivalent, trivalent or tetravalent radical, then being able to connect a plurality of, for instance two, three or four, siloxy units of the formula (X). R encompasses the monovalent radicals —F, —Cl, —Br, —$OR^6$, —CN, —SCN, —NCO and SiC-bonded, substituted or unsubstituted hydrocarbon radicals which may be interrupted by oxygen atoms or a —C(O)— group and also divalent radicals bound to Si at each end as in formula (X). $R^6$ is generally hydrogen or a monovalent, substituted or unsubstituted hydrocarbon radical having from 1 to 20 carbon atoms, preferably hydrogen, an alkyl radical or an aryl radical.

Examples of radicals $R^6$ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isoctyl radicals such as the 2,2,4-trimethylpentyl radical, nonyl radicals such as the n-nonyl radical, decyl radicals such as the n-decyl radical, cycloalkyl radicals such as cyclopropyl, cyclopentyl, cyclohexyl, cycloheptyl and methylcyclohexyl radicals, unsaturated radicals such as the allyl, 5-hexenyl, 7-octenyl, cyclohexenyl and styryl radicals, aryl radicals such as phenyl radicals, o-, m-, p-tolyl radials, xylyl radicals and ethylphenyl radicals, aralkyl radicals such as the benzyl radical and the α- and β-phenylethyl radicals, and also radicals of the formula —$C(R^1)$=$CR^1_2$.

Examples of halogenated radicals $R^6$ are haloalkyl radicals such as the 3,3,3-trifluoro-n-propyl radical, the 2,2,2,2',2',2'-hexafluoroisopropyl radical, the heptafluoroisopropyl radical and haloaryl radicals such as the o-, m- and p-chlorophenyl radicals.

$R^6$ is preferably hydrogen, an alkyl radical or an aryl radical, with particular preference being given to hydrogen and the methyl and ethyl radicals.

If the radical R is a SiC-bonded, substituted hydrocarbon radical, preferred substituents are halogen atoms, phosphorus-containing radicals, cyano radicals, —$OR^6$, —$NR^6$—, —$NR^6_2$, —$NR^6$—C(O)—$NR^6_2$, —C(O)—$NR^6_2$, —C(O)—$R^6$, —C(O)$OR^6$, —$SO_2$-Ph and —$C_6F_5$ where $R^6$ is as defined above and Ph is the phenyl radical.

Examples of radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isoctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals such as cyclopentyl, cyclohexyl, cycloheptyl and methylcyclohexyl radicals, aryl radicals such as phenyl, naphthyl, anthryl and phenanthryl radicals, alkaryl radicals such as o-, m-, p-tolyl radicals, xylyl radicals and ethylphenyl radicals, and aralkyl radicals such as the benzyl radical and the α- and β-phenylethyl radicals.

Examples of substituted radicals R are haloalkyl radicals such as the 3,3,3-trifluoro-n-propyl radical, the 2,2,2,2',2',2'-hexafluoroisopropyl radical, the heptafluoroisopropyl radical, haloaryl radicals such as the o-, m- and p-chlorophenyl radical, —$(CH_2)_n$—$N(R^6)C(O)NR^6_2$, —$(CH_2)_n$—C(O)$NR^6_2$, —$(CH_2)_n$—C(O)$R^6$, —$(CH_2)_n$—C(O)$OR^6$, —$(CH_2)_n$—C(O)$NR^6_2$, —$(CH_2)_n$—C(O)—$(CH_2)_m$—C(O)$CH_3$, —$(CH_2)_n$—$NR^6$—$(CH_2)_m$—$NR^6_2$, —$(CH_2)_n$—O—CO—$R^6$, —$(CH_2)_n$—O—$(CH_2)_m$—CH(OH)—$CH_2$OH, —$(CH_2)_n$—$(OCH_2CH_2)_m$—$OR^6$, —$(CH_2)_n$—$SO_2$-Ph and —$(CH_2)_n$—O—$C_6F_5$, where $R^6$ is as defined above, n and m are identical or different integers in the range from 0 to 10 and Ph is the phenyl radical.

Examples of R as a divalent radical which is Si-bonded at each end as in formula (X) are radicals which are derived from the monovalent examples mentioned above for the radical R by an additional bond being formed by replacement of a hydrogen atom. Examples of such radicals are —$(CH_2)_n$—, —$CH(CH_3)$—, —$C(CH_3)_2$—, —$CH(CH_3)$—$CH_2$—, —$C_6H_4$—, —$CH(Ph)$-$CH_2$—, —$C(CF_3)_2$—, —$(CH_2)_n$—$C_6H_4$— $(CH_2)_n$—, —$(CH_2)_n$—$C_6H_4$—$C_6H_4$—$(CH_2)_n$—, —$(CH_2O)_m$—, —$(CH_2CH_2O)_m$—, —$(CH_2)_n$—$O_x$—$C_6H_4$—$SO_2$—$C_6H_4$—$O_z$—$(CH_2)$— where z is 0 or 1, m and n are as defined above and Ph is the phenyl radical.

The radical R is preferably a monovalent SiC-bonded, substituted or unsubstituted hydrocarbon radical which is free of aliphatic carbon-carbon multiple bonds and has from 1 to 18 carbon atoms, particularly most preferably a monovalent SiC-bonded hydrocarbon radical which is free of aliphatic carbon-carbon multiple bonds and has from 1 to 6 carbon atoms, in particular the methyl or phenyl radical.

The radical $R^1$ can be any group which can undergo an addition reaction (hydrosilylation) with an SiH-functional compound.

If the radical $R^1$ is an SiC-bonded, substituted hydrocarbon radical, preferred substituents are halogen atoms, cyano radicals and —$OR^6$, where $R^6$ is as defined above.

The radical $R^1$ is preferably an alkenyl or alkynyl group having from 1 to 16 carbon atoms, e.g. a vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl or styryl radical, with particular preference being given to using vinyl, allyl and hexenyl radicals.

The molecular weight of the constituent (A) can vary within wide limits, for instance from $10^2$ to $10^6$ g/mol. Thus, the constituent (A) can be, for example, a relatively low molecular weight alkenyl-functional oligosiloxane such as 1,3-divinyltetramethyldisiloxane, but can also be a high molecular weight polydimethylsiloxane polymer having Si-bonded vinyl groups along the chain or at the ends of the chain, e.g. one having a molecular weight of $10^5$ g/mol (number average determined by means of NMR). The structure of the molecules forming the constituent (A) is also not fixed; in particular, the structure of a relatively high molecular weight, i.e. oligomeric or polymeric, siloxane can be linear, cyclic, branched or else resin-like, network-like. Linear and cyclic polysiloxanes are preferably made up of units of the formulae $R_3SiO_{1/2}$, $R^1R_2SiO_{1/2}$, $R^1RSiO_{2/2}$ and $R_2SiO_{2/2}$, where R and $R^1$ are as defined above. Branched and network-like polysiloxanes additionally contain trifunctional and/or tetrafunctional units, preferably units of the formulae $RSiO_{3/2}$, $R^1SiO_{3/2}$, and $SiO_{4/2}$. Of course, it is also possible to use mixtures of different siloxanes which satisfy the criteria of the constituent (A).

As component (A), particular preference is given to using vinyl-functional, essentially linear polydiorganosiloxanes having a viscosity of from 0.01 to 500,000 Pa·s, more preferably from 0.1 to 100,000 Pa·s, in each case at 25° C.

As organosilicon compound (B), it is possible to use all hydrogen-functional organosilicon compounds which have hitherto also been used in addition-crosslinkable compositions.

As organopolysiloxanes (B) which have Si-bonded hydrogen atoms, preference is given to using linear, cyclic or branched organopolysiloxanes comprising units of the average general formula (XI).

$$R_c H_d SiO_{(4-c-d)/2} \quad (XI)$$

where
R can be identical or different and is as defined above,
c is 0, 1, 2 or 3 and
d is 0, 1 or 2,
with the proviso that the sum of c+d is less than or equal to 3 and on average at least two Si-bonded hydrogen atoms are present per molecule.

The organopolysiloxane (B) used according to the invention preferably contains from 0.04 to 1.7 percent by weight of Si-bonded hydrogen, based on the total weight of the organopolysiloxane (B).

The molecular weight of the constituent (B) can likewise vary within wide limits, for instance in the range from $10^2$ to $10^6$ g/mol. Thus, the constituent (B) can, for example, be a relatively low molecular weight SiH-functional oligosiloxane such as tetramethyldisiloxane, but can also be a high molecular weight polydimethylsiloxane polymer having SiH groups along the chain or at the ends of the chain or a silicone resin having SiH groups. The structure of the molecules forming the constituent (B) is also not fixed; in particular, the structure of a relatively high molecular weight, i.e. oligomeric or polymeric, SiH-containing siloxane can be linear, cyclic, branched or else resin-like, network-like. Linear and cyclic polysiloxanes are preferably made up of units of the formulae $R_3SiO_{1/2}$, $HR_2SiO_{1/2}$, $HRSiO_{2/2}$ and $R_sSiO_{2/2}$, where R is as defined above. Branched and network-like polysiloxanes additionally contain trifunctional and/or tetrafunctional units, with preference being given to those of the formulae $RSiO_{3/2}$, $HSiO_{3/2}$ and $SiO_{4/2}$. Of course, it is also possible to use mixtures of different siloxanes which satisfy the criteria of the constituent (B). In particular, the molecules forming the constituent (B) can, if appropriate, also contain aliphatically unsaturated groups in addition to the obligatory SiH groups. Particular preference is given to using low molecular weight SiH-functional compounds such as tetrakis(dimethylsiloxy)silane and tetramethylcyclotetrasiloxane and also relatively high molecular weight, SiH-containing siloxanes such as poly(hydrogenmethyl)siloxane and poly(dimethylhydrogenmethyl)siloxane having a viscosity at 25° C. of from 10 to 10,000 mP·s, or analogous SiH-containing compounds in which part of the methyl groups have been replaced by 3,3,3-trifluoropropyl or phenyl groups.

Constituent (B) is preferably present in the crosslinkable total silicone compositions of the invention in such an amount that the molar ratio of SiH groups to aliphatically unsaturated groups is from 0.1 to 20, more preferably from 1.0 to 5.0.

The components (A) and (B) are commercial products or can be prepared by methods customary in chemistry.

In place of components (A) and (B), it is possible for the compositions of the invention to contain organopolysiloxanes (C) which have aliphatic carbon-carbon multiple bonds and Si-bonded hydrogen atoms, but this is not preferred.

If siloxanes (C) are used, they are preferably ones comprising units of the formulae $$R_g SiO_{4-g/2},\ R_h R^1 SiO_{3-h/2}\ \text{and}\ R_i HSiO_{3-i/2},$$

where R and $R^1$ are as defined above,
g is 0, 1, 2 or 3,
h is 0, 1 or 2 and
i is 0, 1 or 2,
with the proviso that at least two radicals $R^1$ and at least two Si-bonded hydrogen atoms are present per molecule.

Examples of organopolysiloxanes (C) are those comprising $SiO_{4/2}$, $R_3SiO_{1/2}$, $R_2R^1SiO_{1/2}$ and $R_2HSiO_{1/2}$ units, known as MQ resins, with these resins additionally being able to contain $RSiO_{3/2}$ and $R_sSiO$ units, and linear organopolysiloxanes consisting essentially of $R_2R^1SiO_{1/2}$, $R_2SiO$ and RHSiO units in which R and $R^1$ are as defined above.

The organopolysiloxanes (C) preferably have an average viscosity of from 0.01 to 500,000 Pa·s, more preferably from 0.1 to 100,000 Pa·s, in each case at 25° C., and can be prepared by methods customary in chemistry.

Apart from the components (A) to (D), the curable compositions of the invention can additionally contain all further materials which have hitherto also been used for producing addition-crosslinkable compositions.

Examples of reinforcing fillers which can be used as component (E) in the compositions of the invention are pyrogenic or precipitated silicas having BET surface areas of at least 50 $m^2/g$ and also carbon blacks and activated carbons such as furnace black and acetylene black, with preference being given to pyrogenic and precipitated silicas having BET surface areas of at least 50 $m^2/g$.

The silica fillers mentioned can be hydrophilic in character or can have been hydrophobized by known methods. When hydrophilic fillers are mixed in, the addition of a hydrophobizing agent is necessary.

The content of actively reinforcing filler (E) in the crosslinkable composition of the invention is in the range from 0 to 70% by weight, preferably from 0 to 50% by weight.

The compositions of the invention, in particular the polyorganosiloxane compositions, can, if desired, contain further additives in an amount of up to 70% by weight, preferably from 0.0001 to 40% by weight, as constituent (F). These additives can be, for example, inactive fillers, resin-like polyorganosiloxanes which are different from the siloxanes (A), (B) and (C), dispersants, solvents, bonding agents, pigments, dyes, plasticizers, organic polymers, heat stabilizers, etc. They include additives such as quartz flour, diatomaceous earth, clays, chalk, lithopones, carbon blacks, graphite, metal oxides, metal carbonates, metal sulfates, metal salts of carboxylic acids, metal dusts, fibers such as glass fibers, polymer fibers, polymer powders, dyes, pigments, etc.

In addition, additives (G) which serve to specifically set the processing time, starter temperature and crosslinking rate of the compositions of the invention can be present. These inhibitors and stabilizers are very well known in the field of addition-crosslinking compositions. Examples of customary inhibitors are acetylenic alcohols such as 1-ethynyl-1-cyclohexanol, 2-methyl-3-butyn-2-ol and 3,5-dimethyl-1-hexyn-3-ol, 3-methyl-1-dodecyn-3-ol, polymethylvinylcyclosiloxanes such as 1,3,5,7-tetravinyltetramethyltetracyclosiloxane, low molecular weight silicone oils having methylvinyl$SiO_{2/2}$ groups and/or $R_2$vinyl$SiO_{1/2}$ end groups, e.g. divinyltetramethyldisiloxane, tetravinyldimethyldisiloxane, trialkyl cyanurates, alkyl maleates such as diallyl maleate, dimethyl maleate and diethyl maleate, alkyl fumarates such as diallyl fumarate and diethyl fumarate, organic hydroperoxides such as cumene hydroperoxide, tert-butyl hydroperoxide and pinane hydroperoxide, organic peroxides, organic sulfoxides, organic amines, diamines and amides, phosphines and phosphites, nitriles, triazoles, diaziridines and oximes. The effect of these inhibitor additives (G) depends on their chemical structure, so that they have to be determined individually.

The inhibitor content of the compositions of the invention is preferably from 0 to 50,000 ppm, more preferably from 20 to 2000 ppm, in particular from 100 to 1000 ppm.

The compositions of the invention, in particular the organopolysiloxane compositions, can be produced by known methods, for example by uniform mixing of the individual components. The components can be mixed in any order, but preference is given to uniform mixing of the platinum catalyst (D) with a mixture of (A) and (B) or (C), if desired (E), (F) and (G). The platinum catalyst (D) used according to the invention can be incorporated as a solid substance or as a masterbatch, viz. as a uniform mixture with a small amount of (A) or (A) and (E). Depending on the viscosity of (A), mixing is carried out, for example, by means of a stirrer, in a high-speed mixer, on a roll mill or in a kneader.

All compositions which can be crosslinked by addition of Si-bonded hydrogen onto an aliphatic multiple bond can be crosslinked under the same conditions as the previously known compositions which can be crosslinked by means of a hydrosilylation reaction. Preference is given to temperatures of from 80 to 220° C., more preferably from 130 to 190° C., and a pressure of from 900 to 1100 hPa. However, it is also possible to employ higher or lower temperatures and pressures. Crosslinking can also be carried out photochemically using high-energy radiation, e.g. visible light having short wavelengths and UV light, or by means of a combination of thermal and photochemical excitation.

The catalysts of the invention or the catalysts used in the process of the invention or the catalysts present in the compositions of the invention are generally produced from a $TiO_2$ sol or a nanosize titanium dioxide powder, preferably a $TiO_2$ sol, and a solution containing platinum, preferably the solution of a platinum salt.

The process for producing the catalyst comprises the following steps:
a) reaction of a titanium dioxide sol or nanosize titanium dioxide powder with a solution containing platinum,
b) drying of the product obtained in step a),
c) calcination of the product obtained in step b) and
d) reduction of the product obtained in step c).

The production of the catalyst is preferably carried out in an aqueous medium.

The catalyst is produced using standard methods known to those skilled in the art, e.g. by steeping or impregnation, adsorption or (co)precipitation. Preference is given to impregnation of the support with a solution of the catalytically active component, in particular stirring of the components at room temperature in the aqueous medium.

The impregnation is preferably followed by drying at elevated temperature, in particular at 80-100° C., then a calcination step at 300-600° C., in particular up to 450° C., and finally a reduction.

Suitable reducing agents are all materials or mixtures whose redox potential is below the redox potential of the platinum compound used, e.g. materials having a standard potential in aqueous medium of less than +0.5 volt, but preferably having a standard potential of less than 0 volt.

Examples of suitable reducing agents are carboxylic acids such as formic acid, citric acid, lactic acid, tartaric acid and also their alkali metal, alkaline earth metal, ammonium and C1-C10-alkylammonium salts, C1-C10-alkanols such as methanol, ethanol and isopropanol, sugars such as aldoses and ketoses in the form of monosaccharides, disaccharides and oligosaccharides, in particular glucose, fructose and lactose, aldehydes such as formaldehyde, boron-hydrogen compounds or borohydrides, for example boranes, metal boranates and borane complexes, e.g. diborane, sodium borohydride and aminoboranes, in particular trimethylaminoborane, hydrazine and alkylhydrazines such as methylhydrazine, hydrogendithionites and dithionites, in particular sodium and potassium hydrogendithionite, sodium, potassium and zinc dithionite, and also $H_2$.

Preferred reducing agents are formic acid, $NaBH_4$ and/or hydrazine and also $H_2$.

It is also possible to produce the catalyst by means of a spray drying process in a spray drying apparatus. Here, the term spray drying refers to a process in which a solution or slurry of the catalyst components is atomized by means of a nozzle or a similar device into the vaporization chamber of a spray drier and the resulting liquid particles are brought into contact with a stream of a drying gas, e.g. heated air, nitrogen or argon, which is introduced into the vaporization chamber in countercurrent or cocurrent. The temperature of the gas stream is normally 250-400° C. at the inlet and 140-250° C. at the outlet and the temperature difference between inlet and outlet is at least 40° C.

As platinum starting materials for the solution containing platinum, it is generally possible to use inorganic Pt(II) and/or Pt(IV) salts, in particular platinum salts selected from the group consisting of $H_2PtCl_6$, $PtCl_2$, $PtCl_4$, $(NH_3)_4PtCl_2$ and $(NH_3)_4Pt(OH)_2$, and also organic or organometallic Pt compounds such as platinum acetylacetonate or tetrakis(triphenylphosphine)platinum.

It is possible to use platinum-containing solutions of any concentration; preference is given to a solution containing 0.1-10% by weight of platinum.

The solvent should advantageously be chosen so that the platinum compound is soluble in the solvent.

Suitable solvents are water and organic solvents such as linear or branched $C_1$-$C_{10}$-alkanols, e.g. methanol, ethanol, isopropanol, polyhydric alcohols such as ethylene glycol, polyethers such as dimethoxyethane, polyether glycols, ketones such as acetone, aldehydes such as propanol, aromatic hydrocarbons such as toluene. Particular preference is given to water.

The $TiO_2$ sol used for production of the catalyst has a mean particle size in the range 10-100 nm, preferably 10-50 nm, in particular 10-30 nm, and a solids content of 10-30%.

The nanosize $TiO_2$ powder has a particle size of 10-100 nm, preferably 10-50 nm, or below, in particular below 10-30 nm or below, and most preferably, 20-25 nm.

The platinum content of the catalyst can vary in the range from 0.01 to 10% by weight and is preferably in the range from 0.1 to 2% by weight, in particular from 0.1 to 1% by weight.

The BET surface area of the catalyst is generally in the range 20-500 $m^2/g$, preferably 50-250 $m^2/g$.

The abovementioned characteristic and advantageous parameters of the $TiO_2$-supported platinum catalysts likewise apply to the $TiO_2$-supported platinum catalysts used in the process of the invention and also those present in the compositions of the invention.

The total platinum content used in the process of the invention or the composition of the invention is preferably 1-500 ppm, more preferably 20-200 ppm, and that of $TiO_2$ is preferably 0.5-10%.

The novel compositions which can be crosslinked by addition of Si-bonded hydrogen onto an aliphatic multiple bond can be crosslinked under the same conditions as the previously known compositions which can be crosslinked by means of a hydrosilylation reaction.

The process of the invention or the hydrosilylation or crosslinking of the compositions of the invention is generally carried out in a temperature range of 50-200° C., preferably 100-200° C., and in particular from 140 to 200° C.

Crosslinking can, as indicated above, also be carried out photochemically using high-energy radiation such as visible light having short wavelengths and UV light or by means of a combination of thermal and photochemical excitation.

The following examples serve to illustrate the process of the invention and the compositions of the invention and do not constitute any restriction.

EXAMPLES

Production of Supported Pt Catalysts

Comparative Example 1

Production of Pt on $Al_2O_3$ (Spheralite 531 P3)

1.44 g of an aqueous solution of $(NH_3)_4Pt(OH)_2$ are diluted with 35 ml of $H_2O$ (distilled) and stirred with 7.8 g of $Al_2O_3$ (P3; mean particle size 8.9 μm, BET 115 $m^2/g$) at room temperature for 1.5 hours. The solid is then centrifuged off and the powder obtained is dried at 80° C. in a drying oven and subsequently calcined at 450° C. for 5 hours. 2.9 g of the resulting powder are admixed with a solution of 8.7 g of HCOOH (85%) in 150 ml of $H_2O$ in a two-neck flask provided with internal thermometer, reflux condenser and superposed bubble counter and stirred at 45-50° C. until gas evolution is no longer observed (4-5 h). After cooling, the supernatant solution is decanted off, the powder which remains is centrifuged off and dried at 65° C. for 4 hours in a drying oven. This gives a $Pt/Al_2O_3$ powder having a Pt content of 1.23% and a BET surface area of 99.0 $m^2/g$.

Comparative example 2

DT 51, Millenium 1.41 g of an aqueous solution of $(NH_3)_4Pt(OH)_2$ are diluted with 35 ml of $H_2O$ (distilled) and stirred with 7.5 g of $TiO_2$ (DT 51; mean particle size 1.2 μm, BET 90±10 $m^2/g$) at room temperature for 1.5 hours. The solid is then centrifuged off and the powder obtained is dried at 80° C. in a drying oven and subsequently calcined at 450° C. for 5 hours. 3.1 g of the resulting powder are admixed with a solution of 9.3 g of HCOOH (85%) in 160 ml of $H_2O$ in a two-neck flask provided with internal thermometer, reflux condenser and superposed bubble counter and stirred at 45-50° C. until gas evolution is no longer observed (4-5 h). After cooling, the supernatant solution is decanted off, the powder which remains is centrifuged off and dried at 65° C. for 4 hours in a drying oven. This gives a $Pt/TiO_2$ powder having a Pt content of 0.78% and a BET surface area of 83.0 $m^2/g$.

Example 1 According to the Invention

Production of Pt on $TiO_2$ (Hombikat XXS100, Sachtleben; 1.90% Pt)

A mixture of 40.0 g of $TiO_2$ nanosol (Hombikat XXS100, mean particle size 20-25 nm, aqueous $TiO_2$ nanosol containing nitric acid, pH 1, solids content 18%) and 956 mg of $(NH_3)_4Pt(OH)_2$ is stirred at room temperature for 1.5 hours and subsequently dried at 80° C. for 72 hours in a drying oven. The crystals formed are finely ground in a mortar and calcined at 450° C. for 5 hours. 4.8 g of the resulting powder are admixed with a solution of 14.4 g of HCOOH (85%) in 250 ml of $H_2O$ in a two-neck flask provided with internal thermometer, reflux condenser and superposed bubble counter and stirred at 45-50° C. until gas evolution is no longer observed (4-5 h). After cooling, the supernatant solution is decanted off, the powder which remains is centrifuged off and dried at 65° C. for 4 hours in a drying oven. This gives 5.5 g of a $Pt/TiO_2$ powder having a Pt content of 1.90% and a BET surface area of 92.0 $m^2/g$.

Example 2 According to the Invention

Production of Pt on $TiO_2$ (Hombikat XXS100, Sachtleben), 0.17% of Pt

A mixture of 40.0 g of $TiO_2$ nanosol (Hombikat XXS100, mean particle size 20-25 nm, aqueous $TiO_2$ nanosol containing nitric acid, pH 1, solids content 18%) and 95 mg of $(NH_3)_4Pt(OH)_2$ is stirred at room temperature for 1.5 hours and subsequently dried at 80° C. for 72 hours in a drying oven. The crystals formed are finely ground in a mortar and calcined at 450° C. for 5 hours. This gives 4.6 g of a $Pt/TiO_2$ powder. 2.6 g of this $Pt/TiO_2$ powder are admixed with a solution of 7.8 g of HCOOH (85%) in 135 ml of $H_2O$ in a two-neck flask provided with internal thermometer, reflux condenser and superposed bubble counter and stirred at 45-50° C. until gas evolution is no longer observed (4-5 h). After cooling, the supernatant solution is decanted off, the powder which remains is centrifuged off and dried at 65° C. for 4 hours in a drying oven. This gives a $Pt/TiO_2$ powder having a Pt content of 0.17% and a BET surface area of 83.6 $m^2/g$.

General Description of the Test Reactions a) Catalytic Test Reactions without Irradiation A mixture of emulsified DEHESIVE 920® (α,β-divinyldimethylpolysiloxane, viscosity η=500 mPa·s, solids content 54.6%), SiH crosslinker V72 (emulsified H-functional polysiloxane of the formula $Me_3SiO$ —[Si(H)Me-O]$_{48}$ —$SiMe_3$, solids content 37%) and a heterogeneous Pt catalyst is applied by means of a doctor blade (24μm) or a spatula to a glass microscope slide and treated on a hot stage at a given temperature until a "streak test" no longer finds any smearing material.

b) Catalytic Test Reactions with Additional UV Irradiation

In a manner analogous to a), a mixture of emulsified DEHESIVE 920®, emulsified H-functional polysiloxane of the formula $Me_3SiO$—[Si(H)Me-O]$_{48}$—$SiMe_3$ (SiH crosslinker V72) and a heterogeneous Pt catalyst is applied by means of a doctor blade (24 μm) or a spatula to a glass microscope slide and treated on a hot stage with an additional UV lamp at a distance of 10 cm (hand-held UV lamp Dr. Hönle UVAHand 250, radiation intensity at a distance of 10 cm=10.5 mW/cm$^2$, $\lambda_{max}$≈362 nm) at a given temperature until a "streak test" no longer finds any smearing material.

Comparative Example 3

$Pt/Al_2O_3$ Catalyst

A mixture of 10.0 g of emulsified DEHESIVE 920® and 0.6 g of crosslinker V72 is admixed with 42 mg (49 ppm of Pt) of the $Pt/Al_2O_3$ catalyst from comparative example 1, treated in an ultrasonic bath for 10 minutes, stirred vigorously again and tested by the methods a) and b).

| Temperature | Test reaction a) | Test reaction b) |
| --- | --- | --- |
| 160° C. | >20 min. | >20 min. |
| 180° C. | >20 min. | >20 min. |
| 200° C. | 7 min. | 7 min. |

Comparative Example 4

Pt/C Catalyst, 1% of Pt

A mixture of 10.0 g of emulsified DEHESIVE 920® and 0.6 g of crosslinker V72 is admixed with 54 mg (51 ppm of Pt) of Pt/C (1% of Pt, commercial catalyst), treated in an ultrasonic bath for 10 minutes, stirred vigorously again and tested by the methods a) and b).

| Temperature | Test reaction a) | Test reaction b) |
| --- | --- | --- |
| 160° C. | >10 min. | >10 min. |
| 180° C. | 9 min. 20 | 9 min. 20 |
| 200° C. | 7 min. 10 | 7 min. 10 |

Comparative Example 5

Pt/C Catalyst, 10% of Pt

A mixture of 10.0 g of emulsified DEHESIVE 920® and 0.6 g of crosslinker V72 is admixed with 5.4 mg (51 ppm of Pt) of Pt/C (10% of Pt, commercial catalyst), treated in an ultrasonic bath for 10 minutes, stirred vigorously again and tested by the methods a) and b).

| Temperature | Test reaction a) | Test reaction b) |
| --- | --- | --- |
| 160° C. | >10 min. | >10 min. |
| 180° C. | >10 min. | >10 min. |
| 200° C. | 10 min. | 10 min. |

Example 3 According to the Invention

Pt/TiO$_2$ 0.17%; no Irradiation; Total Pt Content 50 ppm

A mixture of 5 g of emulsified DEHESIVE 920® and 0.3 g of crosslinker V72 is admixed with 160 mg (50 ppm of Pt) of the catalyst from example 2 according to the invention (Pt/TiO$_2$ 0.17%), treated in an ultrasonic bath for 10 minutes, stirred vigorously again and tested by the method a).

The total Pt content is 50 ppm and the TiO$_2$ content is 2.93%.

| Temperature | Test reaction a) |
| --- | --- |
| 140° C. | >10 min. |
| 160° C. | 8 min. 10 s |
| 180° C. | 2 min. 50 s |
| 200° C. | 1 min. 10 s |

Without catalyst, no crosslinking occurs at 200° C. even after 10 minutes.

Example 3 according to the invention clearly demonstrates the higher activity of the catalysts used in the process of the invention compared to other supported Pt catalysts.

Example 4 According to the Invention

Pt/TiO$_2$ 0.17%; no Irradiation; Total Pt Content 97 ppm

A mixture of 5 g of emulsified DEHESIVE 920® and 0.3 g of crosslinker V72 is admixed with 320 mg (97 ppm of Pt) of the catalyst from example 2 according to the invention (Pt/TiO$_2$ 0.17%), treated in an ultrasonic bath for 10 minutes, stirred vigorously again and tested by the method a).

The total Pt content is 97 ppm and the TiO$_2$ content is 5.68%.

| Temperature | Test reaction a) |
| --- | --- |
| 140° C. | 7 min. |
| 160° C. | 5 min. 20 s |
| 180° C. | 1 min. 40 s |
| 200° C. | 55 s |

Example 5a according to the invention (Pt/TiO$_2$ 0.17%; with UV irradiation; total Pt content 97 ppm):

A mixture of 5 g of emulsified DEHESIVE 920® and 0.3 g of crosslinker V72 is admixed with 320 mg (97 ppm of Pt) of the catalyst from example 2 according to the invention (Pt/TiO$_2$ 0.17%), treated in an ultrasonic bath for 10 minutes, stirred vigorously again and tested by the method b).

The total Pt content is 97 ppm and the TiO$_2$ content is 5.68%.

| Temperature | Test reaction b) |
| --- | --- |
| 140° C. | 4 min. 40 |
| 160° C. | 3 min. 20 |
| 180° C. | 40 s |
| 200° C. | 35 s |

Example 5b not according to the invention (Pt/TiO$_2$ catalyst which has not been produced using a TiO$_2$ sol):

A mixture of 5 g of emulsified DEHESIVE 920® and 0.3 g of crosslinker V72 is admixed with 34 mg (Pt content 50 ppm) of the Pt/TiO$_2$ catalyst from comparative example 2, treated in an ultrasonic bath for 10 minutes, stirred vigorously again and tested by methods a) and b).

| Temperature | Test reaction a) | Test reaction b) |
| --- | --- | --- |
| 160° C. | >20 min. | >20 min. |
| 180° C. | 10 min. 20 s | 10 min. |
| 200° C. | 5 min. 20 s | 5 min. 20 s |

The Pt/TiO$_2$ catalyst from comparative example 2 displays a lower activity than the catalysts produced via a TiO$_2$ nanosol. Furthermore, such a catalyst displays no significant increase in the activity as a result of irradiation ("UV effect").

Hydrosilylation of Organosilanes Using Pt/TiO$_2$

Example 6 According to the Invention (4 h)

A mixture of 2.49 g (18.66 mmol) of Me(H)Si(OEt)$_2$ and 279 mg of the Pt/TiO$_2$ catalyst from example 2 according to the invention (corresponds to 82 ppm of Pt) is heated to 100° C. (oil bath temperature 100° C.) and 3.0 g (18.75 mmol) of Me(Vi) Si(OEt)$_2$ (Vi=vinyl) are added dropwise (time of dropwise addition=11 min.). The mixture is subsequently stirred at this temperature for 4 hours. According to GC analysis, the hydrosilylation product Me(OEt)$_2$Si—CH$_2$CH$_2$—Si(OEt)$_2$Me is formed in a yield of 72%.

Example 7 According to the Invention (1 h)

A mixture of 0.92 g (5.73 mmol) of Me(Vi) Si(OEt)$_2$ (Vi=vinyl) and 141 mg of the Pt/TiO$_2$ catalyst from example 2 according to the invention (corresponds to 94 ppm of Pt) is heated to 100° C. (oil bath temperature 100° C.) and 1.5 g (11.11 mmol) of Me(H)Si(OEt)$_2$ are added dropwise (time of dropwise addition=15 min.). The mixture is subsequently stirred at this temperature for 1 hour. According to GC analysis, the hydrosilylation product Me(OEt)$_2$Si—CH$_2$CH$_2$—Si—(OEt)$_2$Me is formed in a yield of 60%.

Example 8 According to the Invention

1 h, Additional UV Irradiation

Example 7 according to the invention is repeated with the reaction mixture being additionally irradiated with a UV radiation source fixed in place at a distance of 10 cm (UV lamp Dr. Hönle UVAHand 250, intensity at a distance of 10 cm=10.5 mW/cm$^2$, $\lambda_{max}$≈362 nm). According to GC analysis, the hydrosilylation product Me(OEt)$_2$Si—CH$_2$CH$_2$—Si (OEt$_2$Me is formed in a yield of 66%.

Comparison of the results of examples 7 and 8 according to the invention clearly shows that a "UV effect" (increase in the activity) of the catalyst of the invention is observed even in the hydrosilylation of molecular silanes.

Example 9 According to the Invention (1 h)

A mixture of 0.92 g (5.73 mmol) of Me(Vi) Si(OEt)$_2$ and 13 mg of the Pt/TiO$_2$ catalyst from example 1 according to the invention (corresponds to 94 ppm of Pt) is heated to 100° C. (oil bath temperature 100° C.) and 1.5 g (11.11 mmol) of Me(H)Si(OEt)$_2$ are added dropwise (time of dropwise addition=15 min.). The mixture is subsequently stirred at this temperature for 1 hour. According to GC analysis, the hydrosilylation product Me(OEt)$_2$Si—CH$_2$CH$_2$—Si(OEt)$_2$Me is formed in a yield of 58%.

Example 10 According to the Invention

1 h, Additional UV Irradiation

Example 9 according to the invention is repeated with the reaction mixture being additionally irradiated with a UV radiation source fixed in place at a distance of 10 cm (UV lamp Dr. Hönle UVAHand 250, radiation intensity at a distance of 10 cm=10.5 mW/cm$^2$, $\lambda_{max}$≈362 nm). According to GC analysis, the hydrosilylation product Me(OEt)$_2$Si—CH$_2$CH$_2$—Si(OEt)$_2$Me is formed in a yield of 65%.

Comparison of the results of examples 9 and 10 according to the invention also clearly shows that a "UV effect" (increase in the activity) of the catalyst of the invention is observed in the hydrosilylation of molecular silanes.

The invention claimed is:

1. A hydrosilylatable composition comprising
   (A) at least one compound having at least one aliphatically unsaturated carbon-carbon bond,
   (B) at least one compound having at least one silicon-hydrogen bond and
   (D) a hydrosilylation catalyst applied to nanosize titanium dioxide to form a heterogeneous catalyst composition, wherein the hydrosilylation catalyst applied to the nanosize titanium consists of metallic platinum, and the heterogeneous catalyst composition is obtained by a process comprising the steps:
   a) reacting a titanium dioxide sol or nanosize titanium dioxide powder with a solution containing platinum,
   b) drying of the product obtained in step a),
   c) calcining of the product obtained in step b) and
   d) reducing the product obtained in step c)
   wherein in the titanium dioxide sol used, the mean particle size is in the range 10 nm-100 nm and the solids content is 10-30%, and wherein the mean particle size of the nanosize titanium dioxide powder is in the range of 10 nm to 100 nm.

2. The hydrosilylatable composition of claim 1, wherein the composition is a polyorganosiloxane composition comprising
   (A) at least one polyorganosiloxane which bears at least one radical having aliphatic carbon-carbon multiple bonds,
   (B) at least one polyorganosiloxane having Si-bonded hydrogen atoms or, in place of or in addition to (A) and (B),
   (C) a polyorganosiloxane which bears both SiC-bonded radicals having aliphatic carbon-carbon multiple bonds and Si-bonded hydrogen atoms, and
   (D) a hydrosilylation catalyst applied to nanosize titanium dioxide to form a heterogeneous catalyst composition, wherein the hydrosilylation catalyst applied to the nanosize titanium consists of metallic platinum, and the heterogeneous catalyst composition is obtained by a process comprising the steps:
   a) reacting a titanium dioxide sol or nanosize titanium dioxide powder with a solution containing platinum,
   b) drying of the product obtained in step a),
   c) calcining of the product obtained in step b) and
   d) reducing the product obtained in step c)
   wherein in the titanium dioxide sol used, the mean particle size is in the range 10 nm-100 nm and the solids content is 10-30%, and wherein the mean particle size of the nanosize titanium dioxide powder is in the range of 10 nm to 100 nm.

3. The composition of claim 1, wherein the compounds having at least one aliphatically unsaturated carbon-carbon bond of component (A) are selected from the group consisting of vinyl-functional organosilanes and vinyl-terminated polydimethylsiloxanes and the compounds having at least one silicon-hydrogen bond of component (B) are selected from the group consisting of SiH-functional polysiloxanes and Si-H-functional organosilanes.

4. The composition of claim 1, wherein the hydrosilylation catalyst (D) exhibits photocatalytic activity.

5. The composition of claim 1, wherein the titanium dioxide has a mean particle size in the range of 10-50 nm.

6. The composition of claim 1, wherein the titanium dioxide has a mean particle size in the range of 10-30 nm.

7. The composition of claim 1, wherein the titanium dioxide is nanosize titanium dioxide powder with a mean particle size in the range of 20-25 nm.

8. The composition of claim 1 which exhibits an accelerated cure rate upon exposure to ultraviolet light.

* * * * *